(12) United States Patent
Liang

(10) Patent No.: US 12,151,433 B2
(45) Date of Patent: Nov. 26, 2024

(54) HIGH RESOLUTION, HIGH THROUGHPUT ADDITIVE MANUFACTURING

(71) Applicant: Arizona Board of Regents on Behalf of the University of Arizona, Tucson, AZ (US)

(72) Inventor: Rongguang Liang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 662 days.

(21) Appl. No.: 17/422,632

(22) PCT Filed: Jan. 14, 2020

(86) PCT No.: PCT/US2020/013528
§ 371 (c)(1),
(2) Date: Jul. 13, 2021

(87) PCT Pub. No.: WO2020/150251
PCT Pub. Date: Jul. 23, 2020

(65) Prior Publication Data
US 2022/0088872 A1    Mar. 24, 2022

Related U.S. Application Data

(60) Provisional application No. 62/792,214, filed on Jan. 14, 2019.

(51) Int. Cl.
*B29C 64/277* (2017.01)
*B29C 64/135* (2017.01)
(Continued)

(52) U.S. Cl.
CPC .......... *B29C 64/277* (2017.08); *B29C 64/135* (2017.08); *B29C 64/182* (2017.08);
(Continued)

(58) Field of Classification Search
CPC .... G02B 27/141; G02B 21/16; G02B 21/361; G02B 19/009; G02B 19/0095;
(Continued)

(56) References Cited

U.S. PATENT DOCUMENTS 6,310,342 B1    10/2001    Braunstein et al.
2015/0362717 A1    12/2015    Chen et al.
(Continued)

FOREIGN PATENT DOCUMENTS

WO    2018165613 A1    9/2018

OTHER PUBLICATIONS

International Search Report and Written Opinion mailed May 14, 2020 for International Patent Application No. PCT/US2020/013528 (13 pages).
(Continued)

*Primary Examiner* — Emmanuel S Luk
(74) *Attorney, Agent, or Firm* — Perkins Coie LLP

(57) ABSTRACT

Methods, devices and systems that allow three-dimensional printing of material with high resolution are described. One example system includes a two-photon polymerization (TPP) subsystem including a first light source coupled to an optical fiber positioned to deliver a first laser light to a scanning optical device, and an optical projection subsystem comprising a second light source configured to provide a second light to a digital projection device. A dichroic mirror is positioned to receive light corresponding to the first and the second light source, and an objective lens positioned to provide illumination to a target material for 3D printing. The dichroic mirror is configured to allow light from one of the light sources to pass therethrough to the objective lens, and to allow light corresponding to the other light source to be reflected towards the objective lens to enable simultaneous illumination of the target material.

10 Claims, 11 Drawing Sheets

(51) Int. Cl.
- *B29C 64/182* (2017.01)
- *B29C 64/273* (2017.01)
- *B33Y 10/00* (2015.01)
- *B33Y 30/00* (2015.01)
- *G02B 19/00* (2006.01)
- *G02B 26/08* (2006.01)
- *G02B 27/14* (2006.01)
- *H01S 3/11* (2023.01)
- *H01S 3/16* (2006.01)
- *B29K 83/00* (2006.01)
- *B29L 11/00* (2006.01)

(52) U.S. Cl.
CPC ............ *B29C 64/273* (2017.08); *B33Y 10/00* (2014.12); *B33Y 30/00* (2014.12); *G02B 19/0009* (2013.01); *G02B 19/009* (2013.01); *G02B 19/0095* (2013.01); *G02B 26/0833* (2013.01); *G02B 27/141* (2013.01); *H01S 3/1625* (2013.01); *H01S 3/1636* (2013.01); *B29K 2083/00* (2013.01); *B29K 2995/0026* (2013.01); *B29L 2011/0041* (2013.01)

(58) Field of Classification Search
CPC ............ G02B 26/0833; G02B 19/0009; B29C 64/277; B29C 64/273; B29C 64/182; B29C 64/135
See application file for complete search history.

(56) References Cited

U.S. PATENT DOCUMENTS

| | | | |
|---|---|---|---|
| 2016/0033874 A1* | 2/2016 | Tang | G02B 21/0024 359/291 |
| 2016/0199935 A1* | 7/2016 | Chen | G01J 3/12 219/121.61 |
| 2017/0120518 A1* | 5/2017 | DeMuth | B23K 15/06 |
| 2017/0123237 A1* | 5/2017 | DeMuth | B22F 12/30 |
| 2017/0205034 A1* | 7/2017 | Lau | G09F 13/00 |
| 2017/0348913 A1* | 12/2017 | Lin | B29C 64/264 |
| 2018/0065186 A1* | 3/2018 | Cullinan | H01L 23/4985 |
| 2018/0207725 A1* | 7/2018 | Chen | B23K 26/0006 |
| 2019/0084241 A1* | 3/2019 | Krishnaswamy | B29C 64/268 |
| 2021/0001540 A1* | 1/2021 | Saha | B29C 64/393 |
| 2021/0237354 A1* | 8/2021 | Soman | G02F 1/37 |
| 2022/0110681 A1* | 4/2022 | Angle | B23K 26/0006 |
| 2022/0152924 A1* | 5/2022 | Chen | B29C 64/106 |

OTHER PUBLICATIONS

Rekstyte, Sima, et al., "Three-dimensional laser micro-sculpturing of silicone: towards bio-compatible scaffolds," Optics Express, vol. 21, No. 14, 2013 (14 pages).

* cited by examiner

HIGH RESOLUTION, HIGH THROUGHPUT ADDITIVE MANUFACTURING

CROSS REFERENCE TO RELATED APPLICATIONS

This patent document is a 371 National Phase Application of International Patent Application No. PCT/US2020/013528, filed Jan. 14, 2020, which claims priority to the provisional application with Ser. No. 62/792,214, titled "High Resolution, High Throughput Additive Manufacturing," filed Jan. 14, 2019. The entire contents of the above noted application are incorporated by reference as part of the disclosure of this document.

TECHNICAL FIELD

The subject matter of this patent document generally relates to three-dimensional printing systems and particularly to methods and devices that allow three-dimensional printing of material with high resolution.

BACKGROUND

Over the past few decades, there has been an increasing interest in the fabrication of complex high-resolution three-dimensional (3D) parts. However, the resolutions of existing printing technologies, such stereolithography (SLA), polyjet modeling (PJM) or multijet modeling (MJM), are sufficient for many applications. Further, the traditional fabrication methods, such as diamond turning, photolithography, electron-beam lithography, femtosecond laser lithography, nanoimprint lithography, and the like, among other disadvantages, are slow and expensive.

SUMMARY OF CERTAIN EMBODIMENTS

The disclosed embodiments, among other features and benefits, address the above problems through the disclosed methods, devices and systems to provide versatile, high resolution, and high-speed three-dimensional (3D) printing.

One example system for high-resolution 3D printing includes a two-photon polymerization (TPP) subsystem including a first light source coupled to an optical fiber positioned to deliver a first laser light to a scanning optical device, and an optical projection subsystem comprising a second light source configured to provide a second light to a digital projection device. The system further includes a dichroic mirror positioned to receive light corresponding to the first light source from the scanning optical device and to receive light corresponding to the second light source from the projection device, and an objective lens positioned to provide illumination to a target material for 3D printing. In this system, the dichroic mirror is configured to allow one of the light corresponding to the first light source or the light corresponding to the second light source to pass therethrough to the objective lens, and to allow the other of the light corresponding to the first light source or the light corresponding to the second light source to be reflected towards the objective lens.

DETAILED DESCRIPTION

Figure 1A:
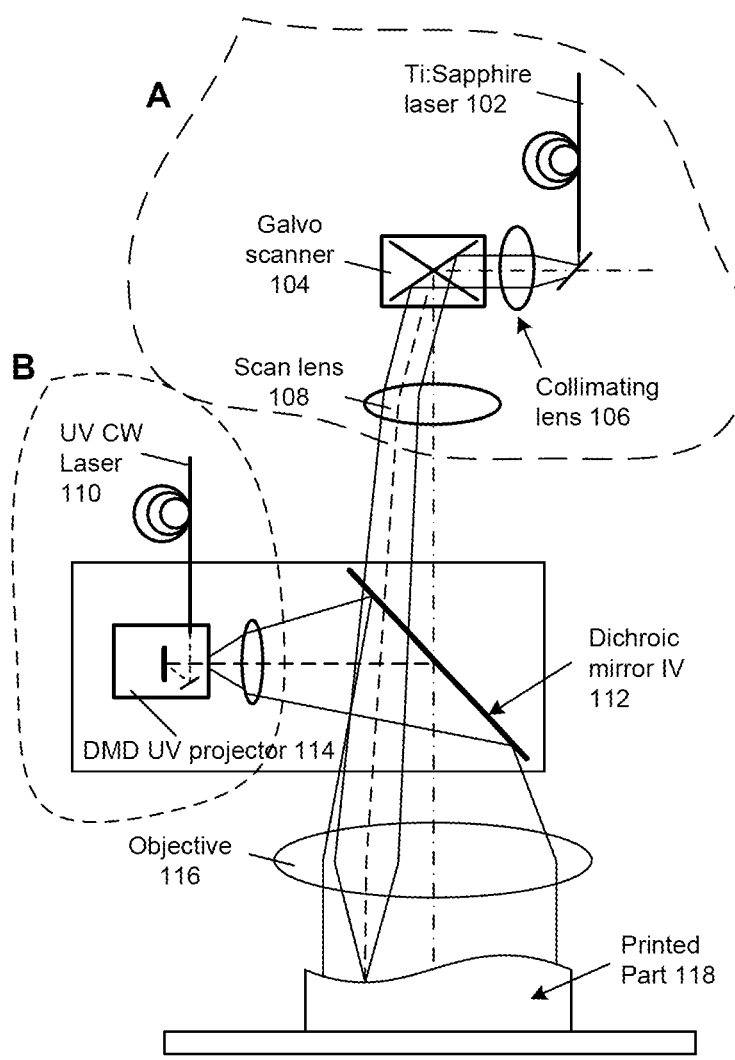
FIG. 1(a) illustrates a diagram of a printing apparatus that enables high-resolution 3D printing in accordance with an example embodiment.

Three-dimensional (3D) printing is an additive manufacturing (AM) technique for fabricating a wide range of structures and complex polymer component from three-dimensional model data. The process consists of printing successive layers of materials that are formed on top of each other. Stereolithography (SLA), polyjet, and multijet modeling (PJM/MJM) are three commonly used techniques.

SLA is an additive manufacturing process that works by focusing an ultraviolet (UV) laser on to a vat of photopolymer resin; the resin is photochemically solidified and forms a single layer of the desired 3D object. Then the build platform lowers one layer to print another layer, and this process is repeated for each layer of the design until the 3D object is complete. Completed parts must be washed with a solvent to clean wet resin off their surfaces. It is also possible to print objects "bottom up" by using a vat with a transparent bottom and focusing the UV or deep-blue polymerization laser upward through the bottom of the vat.

Polyjet or multijet modeling (PJM/MJM) use a printhead with one or more nozzles to layer liquid acrylic polymers onto a build platform that is instantly UV cured. The printhead moves across the platform during the process until a layer is completely printed. Fine layers accumulate on the build tray to create one or several precise 3D parts. Where overhangs or complex shapes require support, the 3D printer jets a removable support material. These techniques, with microscopic layer resolution and accuracy down to 0.1 mm, can produce thin walls and complex geometries using the widest range of materials. Luxexcel's proprietary "Printoptical" technology is one type of MJM. It is based on wide-format industrial inkjet printing equipment which is modified to enable the Printoptical process. Transparent droplets of a UV curable polymer are jetted and then cured by strong UV-lamps which are integrated onto the print head.

The resolutions of existing techniques, however, are not sufficient for many current and future applications that require very high-resolution parts that can be printed at low costs. The traditional fabrication methods, such as diamond turning, photolithography, electron-beam lithography, femtosecond laser lithography, nanoimprint lithography, etc., are slow and expensive. 3D printing techniques, including two-photon polymerization (TPP), projection microstereo-Lithography (PμSL), direct ink writing (DIW) and electrohydrodynamic printing (EHDP), have recently emerged with some promise in that various studies have demonstrated the capability of those methods in printing complex structures. But each of these technologies has inherent limitations.

In particular, two photon polymerization (TPP) has emerged as a promising 3D micro/nanoscale manufacturing tool for rapid and flexible fabrication of arbitrary and ultraprecise 3D structures with sub-100-nm resolution. Compared to conventional SLA, TPP is a true 3D printing technique as it doesn't need the supporting materials or the layer-by-layer printing process. In TPP, laser pulses are focused into the volume of a photosensitive material (or photoresist) to start a two-photon polymerization through two-photon absorption and subsequent polymerization. For example, after the desired structure inside the photoresist volume is illuminated and then developed (e.g., to remove the regions that were not illuminated), the polymerized material remains form the desired 3D structure. This way, computer-generated 3D structures can be formed by direct laser recording into the volume of a photosensitive material. Commercial TPP equipment, such as Photonic Professional GT from Nanoscribe GmbH and LithoProf3D from Multiphoton Optics GmbH, have been launched and investigated for printing various complex components. However, TPP is limited in its ability to fabricate macroscale objects due to its inherent problem of single point curing approach.

UV projection microstereolithography (UV-PμSL) and infrared (IR) projection microstereolithography (IR-PμSL) are two other 3D printing techniques. By projecting a pattern onto photosensitive materials, PμSL techniques provide high-throughput additive microfabrication capabilities that allow for rapid generation of highly complex 3D microstructures with minimum feature size down to 1 μm in a layer-by-layer fashion. Although the resolution is not as high as that associated with the TPP technique, PμSL combines advantages of conventional SLA and projection lithography to achieve high-throughput fabrication of complex 3D objects. One issue associated with the PμSL technique is that the resolution is relatively low (compared to TPP) and it is difficult to print objects with undercut (which would be needed, for example, for printing certain optical components).

Direct ink write (DIW) is another printing technique that moves an ink-depositing nozzle to create objects with controlled architectures and compositions by solidifying inks through UV curing, liquid evaporation, gelation, or temperature- or solvent-induced phase change. Typically, the resolution of DIW technique is defined by the diameter of printing nozzles, the minimum feature size can be down to 1 μm by using microcapillary nozzles of varying diameter (0.5-5.0 μm). One main advantage of direct ink writing is the diversity of printable materials, such as polymers, waxes, hydrogels, cell spheroids ceramics and even metals. However, one of the problems for high-resolution DIW lies in the material design and shear thinning to allow ink to be extruded under pressure. Another problem associated with DIW is that it is less capable in printing complex structure compared to TPP or PμSL.

As evident from the above description, none of the above techniques can print high resolution complex macrostructure at high speeds. The disclosed embodiments, among other features and benefits, address the above problems through the disclosed methods, devices and systems that uniquely combine TPP-based and PμSL-based techniques to provide a high resolution, high speed printing device.

FIG. 1(a) illustrates a macrostructure of a printing apparatus that provides the key features of the two systems (high resolution in TPP and high speed in PμSL) in accordance with the disclosed technology. At the top section of FIG. 1(a) (section designated as A), an example TPP configuration is depicted that uses a Ti:Sapphire laser 102 that passes through a collimating lens 106 onto the a galvanometer scanner 104 and scan lens 106 to provide the scanning laser to a dichroic element 112. In the section designated as B, an example PμSL configuration is shown that uses a UV CW laser 110 and a projector 114 (e.g., a DMD projector) to provide a beam to the dichroic mirror 112. In the example configuration of FIG. 1(a), the two sections of the system are integrated together by the dichroic mirror 112 which transmits the light from the TPP laser and reflects the light from PμSL projector 114. The two sections share the same custom objective 116 which has a large field of view, and allows the object 118 (print material) to be illuminated. The illumination can be provided to the object from the two sections simultaneously, or sequentially.

Figure 1B:
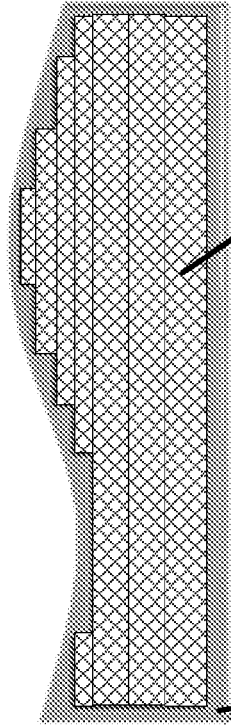
FIG. 1(b) illustrates an example of a structure that is printed in accordance with some embodiments.
Figure 1C:
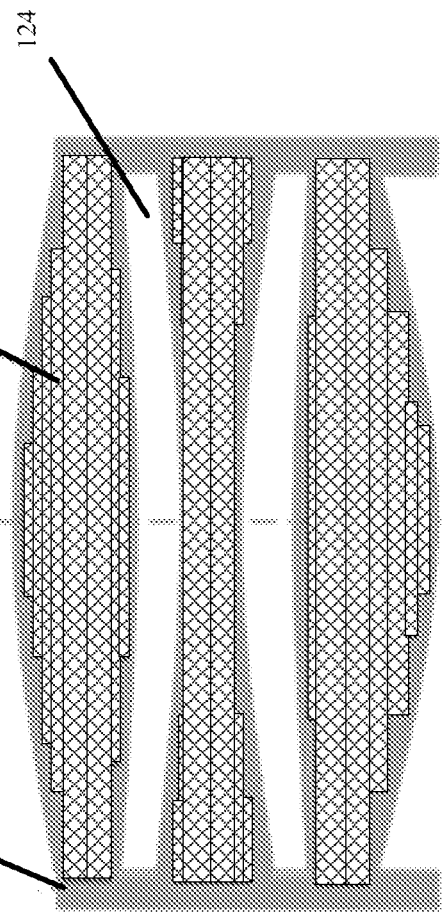
FIG. 1(c) illustrates another example of a structure that is printed in accordance with some embodiments.

After the relative position of two systems is calibrated, they can work together to print large, complex components with high resolution and high speed. FIG. 1(b) illustrates an example printed structure that is printed by the printing apparatus. In this example, the TPP section of the printing apparatus is used to print the edges, outer surfaces and/or regions of the structure (shown as shaded regions 120) to control the component's dimensions and surface profiles and contours accurately, while PμSL section of the printing apparatus is used to print the internal regions (shown as the cross-hatched region 124) in high speed (e.g., layer by layer). FIG. 1(c) illustrates another example compound structure (e.g., a compound lens), in which the TPP section of the printing apparatus is used to print the outer regions of individual components 120, including the edges that delineate the spacers between the components (e.g., lenses), whereas the PμSL section is used to print the bulk regions 122 internal to the structure (shown as crossed hatched areas). In one example configuration, having a custom long working distance and large field of view objective, the disclosed printing apparatus is capable of printing high-resolution centimeter-scale elements at a high speed, and with uniform (or different) properties, as needed. Using the disclosed technology, the high-speed capability of printing via projection technologies, such as PμSL, can be married with the high-precision printing capabilities of TPP to simultaneously print different sections of a structure having different precision requirements.

It should be noted that while some of the examples provided in this document relate to printing optical components, these examples are provided for illustration purposes only, and they should not be construed as limiting the scope of the disclosed embodiments.

Figure 2:
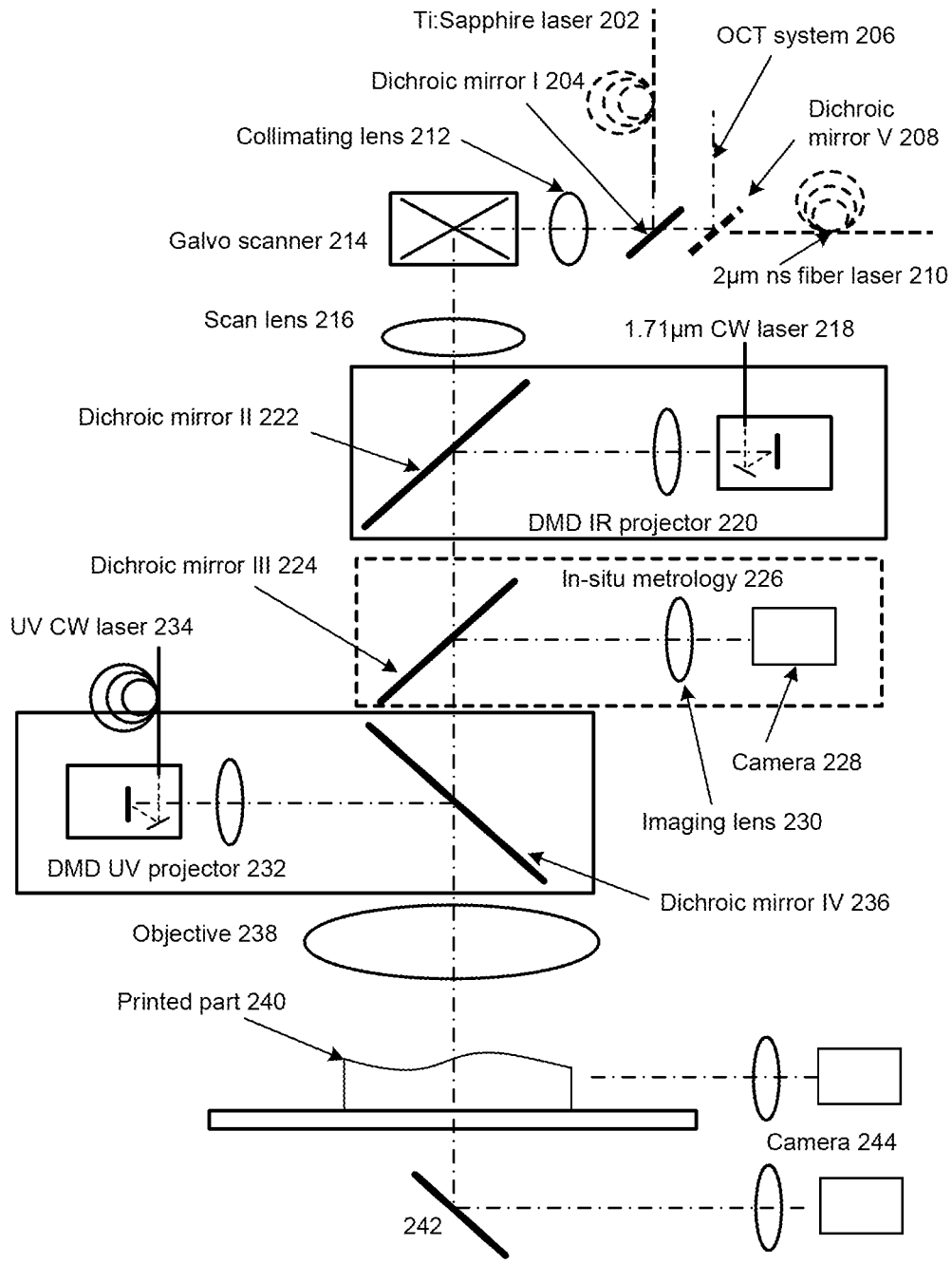
FIG. 2 illustrates an additive multi-material multi-scale manufacturing system (AM$^3$S) in accordance with an example embodiment.

In some embodiments, the disclosed printing system can include additional components and capabilities as described below. In various example embodiments, the printing system overcomes the shortcomings of prior systems related to (1) achievable resolution vs. throughput, (2) multi-scale capability, (3) multi-material capability, (4) in-situ metrology, and (5) lack of flexibility for supporting fundamental research on materials, curing process, printing techniques, system modeling, and education. An example of such a system (sometimes referred to herein an additive multi-material multi-scale manufacturing system ($AM^3S$)), is illustrated in the system of FIG. 2 as a multi-functional modular system that includes four subsystems: manufacturing system, ultraviolet (UV) curing system, Infrared (IR) photo-thermal curing system, and in-situ metrology system. The various subsystems in the example configuration of FIG. 2 are arranged as follows. Illumination from a Ti:Sapphire laser 202 is directed to dichroic mirror I 204 to collimating lens 212 galvo scanner 214 and scan lens 216. Light from an IR laser 210 is provided to dichroic mirror 208 and to an IR projector 220 and associated lens, which directs the light to dichroic mirror II 222. Light from the scan lens 216 is also provided to the same dichroic mirror 222. The in-situ metrology system 226 can include a camera 228 and an imaging lens 230 that receives light from the object via dichroic mirror III 224. A UV laser 234 provides illumination to a UV projector 232, such as a DMD projector, which provides UV illumination to dichroic mirror IV. Light from the different subsystems (UV curing, IR curing, TTP, etc.) is provided to the object 240 via objective 238 to enable 3D printing to take place. The $AM^3S$ can also include an OCT system 206 and additional cameras 224 and dichroic mirror 242.

Figure 3:
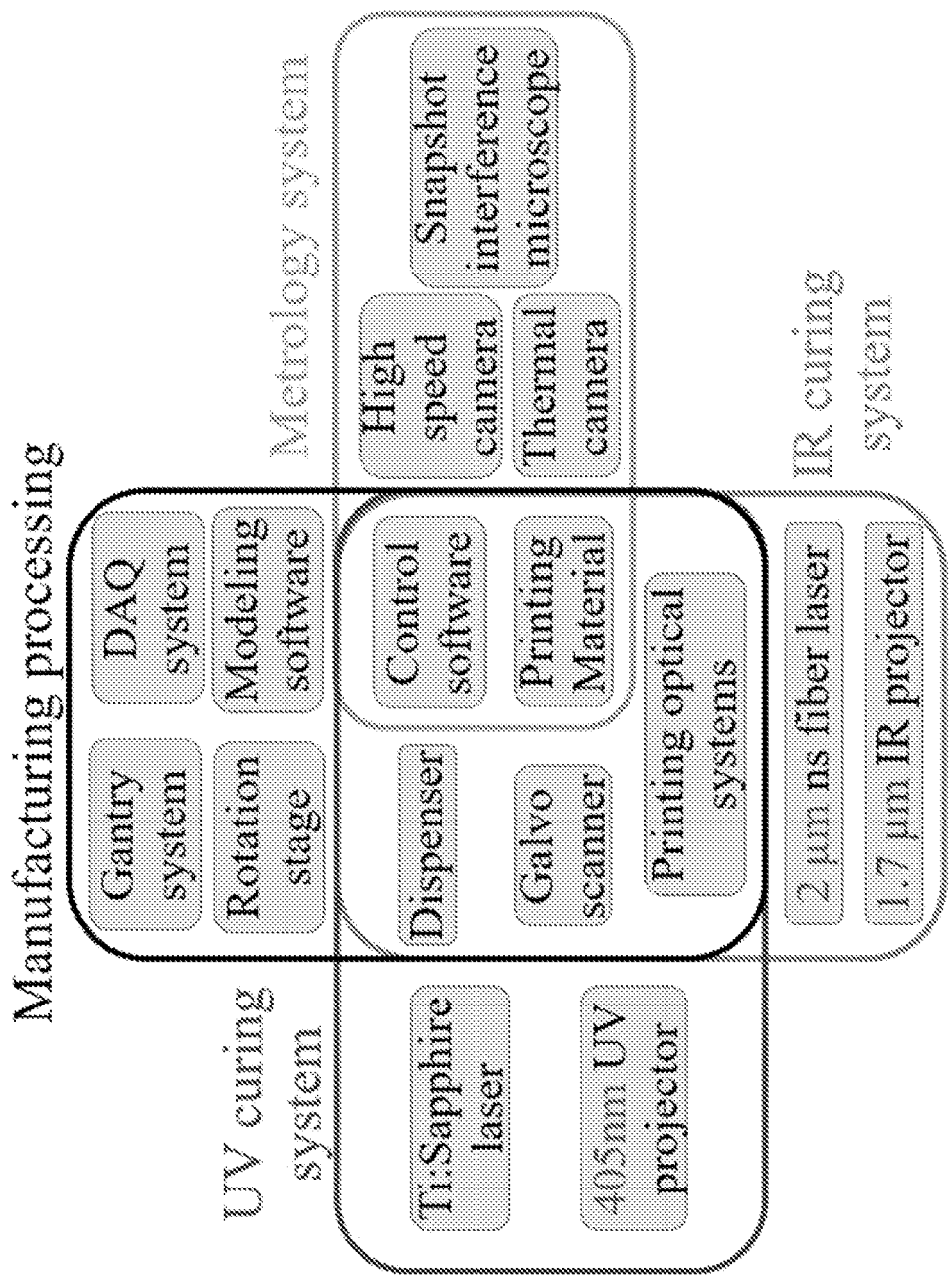
FIG. 3 is a block diagram of an AM$^3$S configuration illustrating various subsections of the AM$^3$S in accordance with an example embodiment.

FIG. 3 is a block diagram of the $AM^3S$ configuration that also illustrates the various subsections of the example $AM^3S$ with overlapping boundaries. The following provides a description of various components that may be implemented as part of different subsystems of the $AM^3S$. It should be noted that these examples are provided for illustration purposes to facilitate the understanding of the underlying technology.

The manufacturing subsystem of $AM^3S$ can include components such as printing optical systems, a computer-controlled multi-axis Cartesian gantry-type motion platform with dual Z-axes, galvanometer scanner, rotation stages, material dispensers, printing material vats, data acquisition (DAQ) system, modeling software, and control software. The UV curing system can include material dispensers, galvanometer scanner, printing optical systems, control software, printing material (in vats), Ti:Sapphire laser, and a UV projector. The IR curing system can include material dispensers, galvanometer scanner, printing optical systems, control software, printing material (in vats), one of or IR lasers. The metrology system can include material dispensers, galvanometer scanner, printing optical systems, control software, printing material (in vats), a high speed camera, a thermal camera and a snapshot interference microscope.

The following provides specific examples of various components that can be used in one implementation. A multi-axis Cartesian gantry-type motion platform (such as Aerotech AGS15000-500-500) can be used. The axes of the platform can operate with high precision positioning, a nominal accuracy of +/−1.5 µm and repeatability of +/−0.5 µm, to print high-precision components. The travel range of 500×500 mm can be justified to print elements as large as 250 mm, considering the dimension of dual Z-axis stage. The motion platform is fully programmable in standard CNC G-code to print freeform objects and features. An AGR100 motorized rotary stage can be used for printing highly rotationally symmetric elements and features in high speed. The presence of a large, clear aperture of 100 mm in the stage allows addressing applications requiring a through-hole to mount on-machine metrology system for the curing process and material development. An AGV-SPO single-pivot point galvanometer scanner can be used to enable high resolution elements in high speed. It can be directly driven by an Aerotech's Nmark GCL galvo controller, which offers a full suite of advanced applications tools, including Position Synchronized Output. This configuration also enables a larger field of view and reduced spot distortion for critical precision printing applications.

At least two material dispensers can be integrated to the system to support multi-material printing in drop-on-demand mode. The dispensers are controlled using digital input and can be programmed to accommodate a wide range of materials with viscosity from 1 cP to well over a million cP. One significant advantage is volume control, which can be less than 100 picoliters. A DAQ and control system is used to control all motion axes and communicates with cameras, dispensers, and modeling software. The objective can be designed to meet the desired printing resolution and dimensions. In one example, in order to print centimeter-scale parts, two different objectives are provided to meet various needs: one with a large field of view (e.g., 15 mm×15 mm), a long working distance (e.g., 20 mm), and a medium numerical aperture (e.g., NA=0.5) and the other with a smaller field of view (e.g., 5 mm×5 mm), a smaller working distance (e.g., 10 mm), and a high numerical aperture (e.g., NA=1.0).

The UV curing subsystem, in one example embodiment, includes a Mai Tai Mode-Locked Ti:Sapphire femtosecond (fs) laser (e.g., 690 nm-1040 nm) and a 405 nm UV digital micromirror device (DMD) projector. The subsystem can be configured for high resolution, high throughput, and multi-scale printing for polymer elements. In one example, a photonic crystal fiber is used to deliver the laser light to the print head. A 405 nm UV source can be used in a projector based PµSL system in addition to a TI DLP9500UV (0.95 UV 1080p 2× LVDS DMD).

The IR photo-thermal curing subsystem, in one example embodiment, includes a 2 µm picosecond (ps) fiber laser and an IR DMD projector with 1.71 µm CW laser. The 2 µm fiber laser can create small and accurate features from the photo-thermal curable materials. An IR projector and TI's DLP4500NIR and 1.71 µm CW laser can be integrated for fast curing silicones as their absorptions at this wavelength is very high. As shown in FIG. 2, the dichroic mirror II combines the above two curing techniques together for printing of photo-thermal curable materials to produce high resolution components at high speeds, similar to the approach in FIG. 1(a). Each of curing configurations can be used to fast cure the materials in drop-on-demand mode with material dispensers, as well. The subsystem can be configured for high resolution, high throughput, and multi-scale printing from thermally curable materials. The DMD projector with an IR laser is also suitable for selective laser sintering (SLS) 3D printing.

The in-situ metrology subsystem, in some example embodiments, can include a high-speed camera, custom polarization-sensitive optical coherence tomography (PS-OCT), and custom snapshot interferometric system for investigating the curing process, closed-loop printing control, and on-machine metrology. On-machine allows monitoring of the printing process and provides feedback for closed-loop printing in real time. A high-speed camera and a thermal camera can provide currently-unavailable fundamental information on local curing region for creating and validating simulation models, and filling the knowledge gap on curing degree vs. curing condition.

Each of UV and thermal curing systems can operate either in a stand-alone or integrated manner in a common command-and-control environment. The light sources can be coupled to the fibers which can be easily connected to the system so that the print head is lightweight and can move smoothly for high speed printing. It should be noted that different types of light sources and devices can be used to effectuate 3D printing through projection; non-limiting examples include laser sources, light emitting devices (LEDs), lamps such as UV and IR lamps and others.

Multi-material printing: With different printing techniques, the system can print UV curable and photo-thermal curable materials. With multiple material dispensers, the system can print multi-materials with different properties simultaneously or sequentially.

Multi-scale printing: The system with custom large field of view, long working distance, and high numerical aperture objective can print complex multi-material parts at a resolution ranging from 100 nm to 100 µm, dimensions ranging from micrometer to quarter-meter scale (limited by the travel range of the motion stage), and different forms ranging from rigid to deformable.

Figure 4:
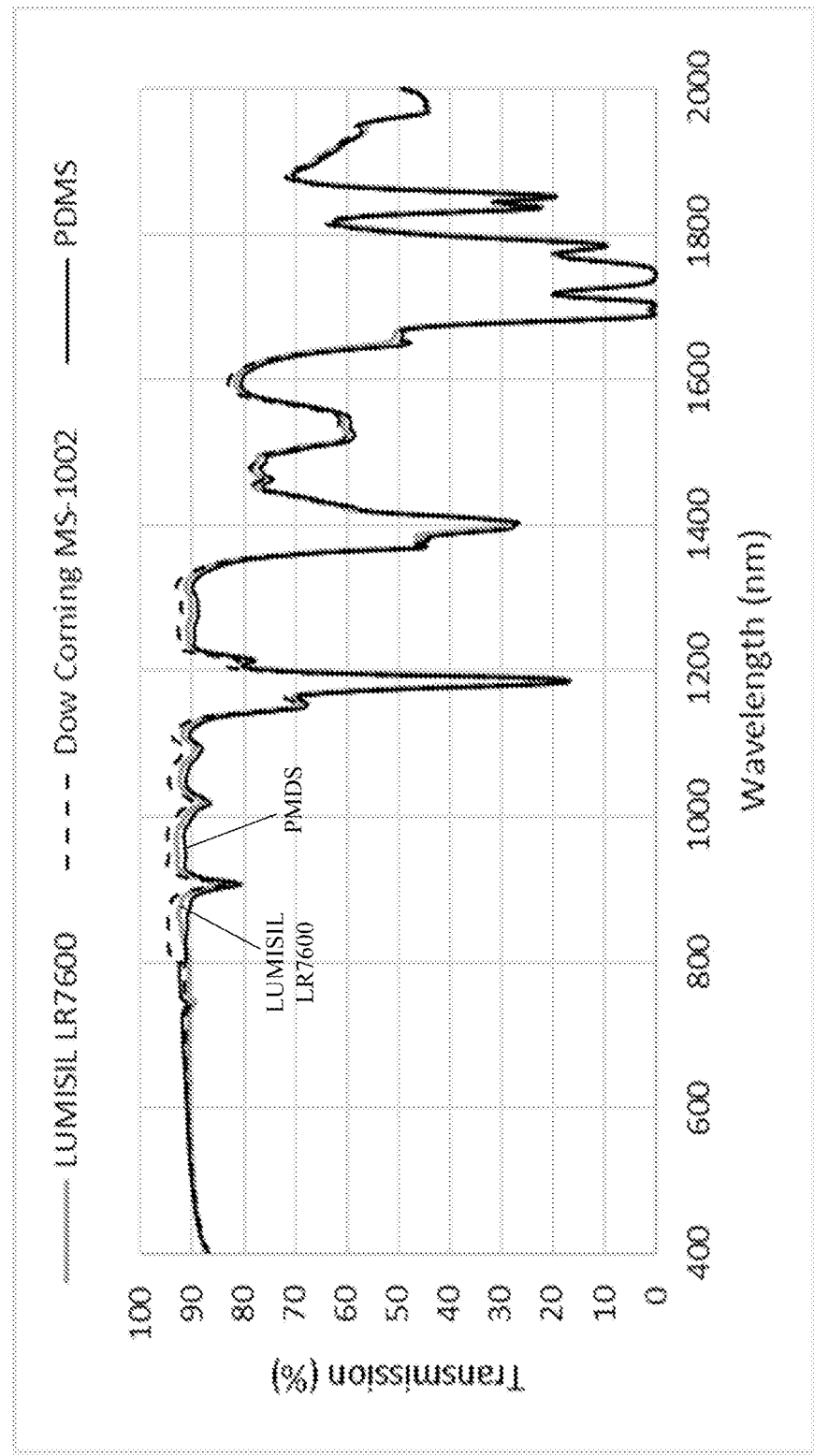
FIG. 4 is an example plot of transmission versus wavelength for three different transparent silicones.

High resolution printing of silicones: Thermally curable silicones, such as polydimethylsiloxane (PDMS) and silicone rubber, are widely used in a variety of products, including electronics, optics, medical devices, and implants. Various manufacturing methods have been reported to fabricate components from transparent silicones, but none of them can precisely control the shape of the components. FIG. 4 illustrates the transmission spectra for three different transparent silicones, Lumisil LR7600, Dow Corning MS-1002 and PMDS. As evident from FIG. 4, at about 1.7 µm, the material appears substantially opaque, which indicates that incident illumination is substantially absorbed, leading to a rise in temperature of the material that can be used for curing. Accordingly, in some embodiments, an ultrafast IR laser is used to induce a rapid temperature increase in the focal region of the silicone material through strong light absorption, which leads to an improved curing rate and allows precise control of the cured volume pixel (voxel). In general, the wavelength of the laser can be selected to match a region of high IR absorption in the material (or vice versa). In one example, a 2 µm laser is selected; in this example, while the 2 µm wavelength may not optimally match the highest absorption region, it nevertheless provides a relatively high absorption. Using such techniques, rapid, photo-thermal curing of silicones with ultrafast IR lasers can be implemented to meet the tight requirements for optical and other applications.

In another example embodiment, an IR-PµSL with a 1710 nm CW laser is used to enable printing of silicone material. The material absorption of transparent silicones at 1710 nm is significant as shown in FIG. 4. In yet another example embodiment, an ultrafast IR laser is combined with an IR-PµSL system together for high resolution, high throughput printing for silicone materials.

Current systems are limited by the lack of in-situ process monitoring to identify defects in real time and understand the printing process. The use of the disclosed in-situ devices enables implementation of an in-process monitoring technique based on polarization-sensitive optical coherence tomography (PS-OCT), and determination of the curing volume and degrees under different curing conditions with high speed camera and Raman spectroscopy.

Figure 5:
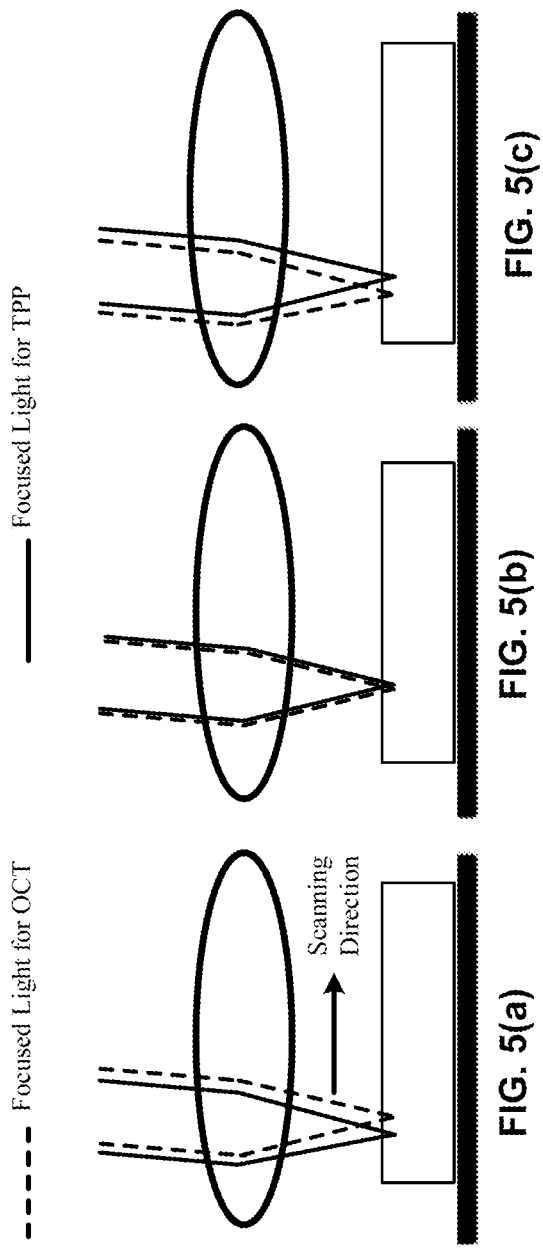
FIG. 5(a) illustrates separated locations of focused light spots associated with a polarization-sensitive optical coherence tomography (PS-OCT) system and a two photon polymerization (TPP) system in accordance with an example embodiment.
FIG. 5(b) illustrates coincident locations of focused light associated with a polarization-sensitive optical coherence tomography (PS-OCT) system and a TPP system in accordance with an example embodiment.
FIG. 5(c) illustrates separated locations of focused light spots associated with a polarization-sensitive optical coherence tomography (PS-OCT) system and TPP system in accordance with another example embodiment.

OCT has been investigated and has the unique capability of imaging surface topography, surface roughness, and internal structures, identifying voids, pores, cracks, variations in density and refractive index for optically clear and translucent materials. In the configuration of FIG. 2, the dichromic mirror V positioned between the dichroic mirror I and 2 µm laser enables the measurement light from a custom long-range PS-OCT. The focal point of PS-OCT can be adjusted so that PS-OCT can measure the pre-cured point, curing point, or post-cured point. FIGS. 5(a) to (c) shows measurement location of PS-OCT relative to the curing point by TPP, before the cured point (FIG. 5(a)), at the curing point (FIG. 5(b)), and after the cured point (FIG. 5(c)). That is, in FIG. 5(a), the focused light for OCT is positioned laterally separate from, and ahead of, the focused light for TPP in the scan direction; in FIG. 5(c), the focused light for OCT is positioned laterally separate from, and prior to, the focused light for TPP in the scan direction; and in FIG. 5(b), the two focused beams coincide. PS-OCT can take measurement simultaneously as TPP cures the material. Because PS-OCT can obtain additional information carried by the polarization state of the light that has interacted with the cured material, it can provide information regarding material birefringence of the cured material, which is a common issue in 3D printed polymers.

Figure 6:
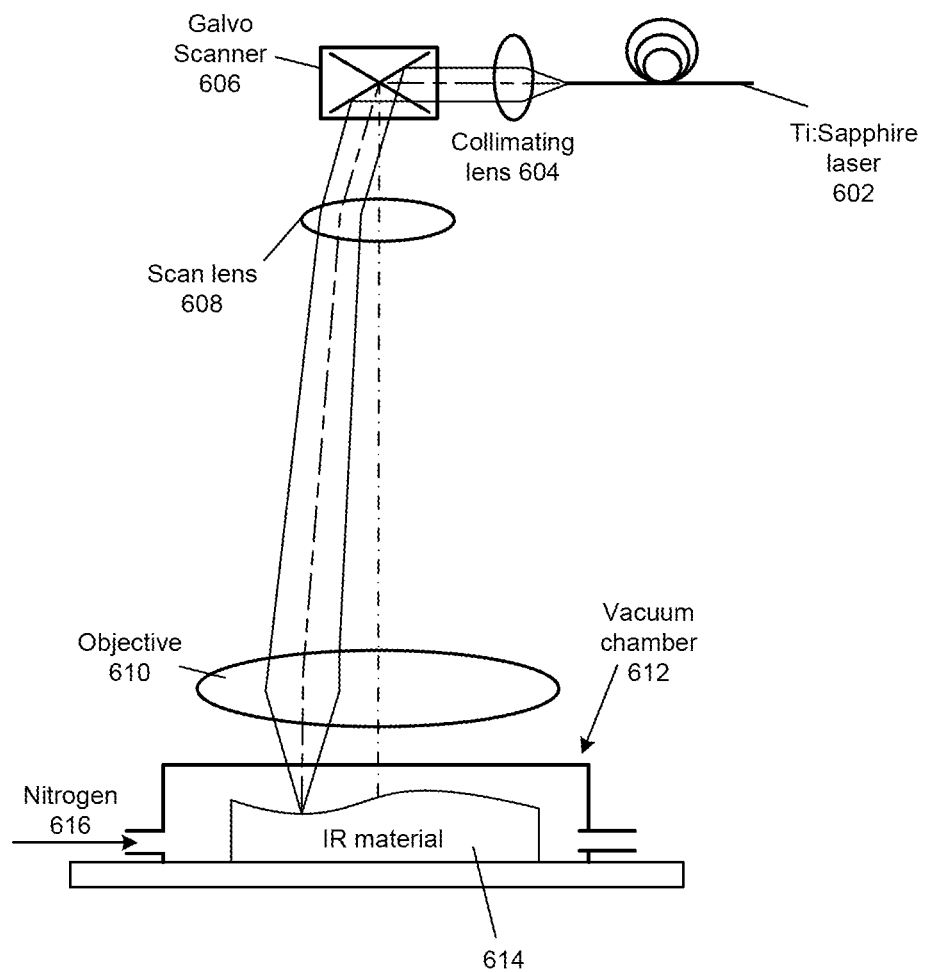
FIG. 6 illustrates an IR 3D printing system in accordance with an example embodiment.

Print IR material: Another important feature of the disclosed embodiments is the capability of manufacturing under controlled environments, such as printing in a nitrogen or argon environment to prevent oxidation and hydrolysis from atmospheric $O_2$ and $H_2O$ which is critical for infrared transmission. FIG. 6 illustrates an IR 3D printing system in accordance with an example embodiment. In this example, configuration, light from a Ti:Spphire laser 602 is collimated by a collimating lens 604 and provided to a galvo scanner 606. The light reaches the material 614 after passing through the scan lens 608 and the objective lens 610. With the long working distance of the objective 610, a compact vacuum chamber 612 with a flat window can be added to the system to accommodate printing under different environmental conditions. For example, the chamber can be filled with Nitrogen gas 616.

Figure 7A:
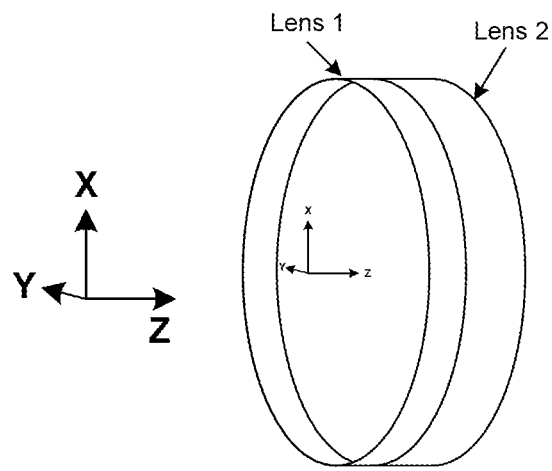
FIG. 7(a) illustrates an example doublet that can be printed using the disclosed 3D printing systems and processes.
Figure 7B:
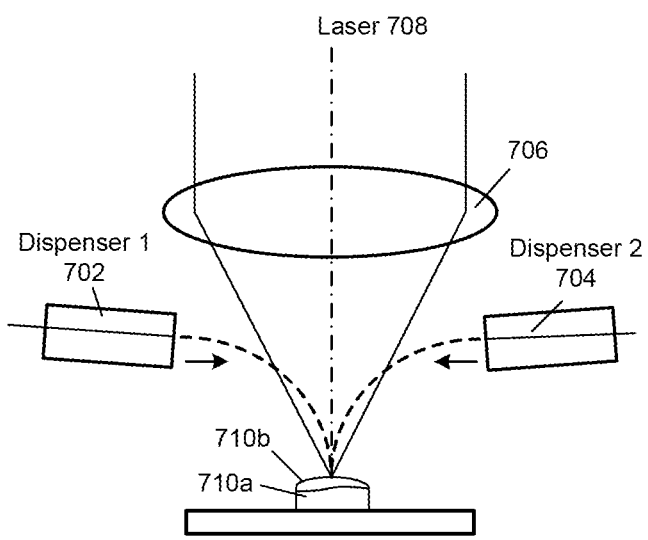
FIG. 7(b) illustrates a first 3D printing process for producing the doublet of FIG. 7(a) in accordance with an example embodiment.
Figure 7C:
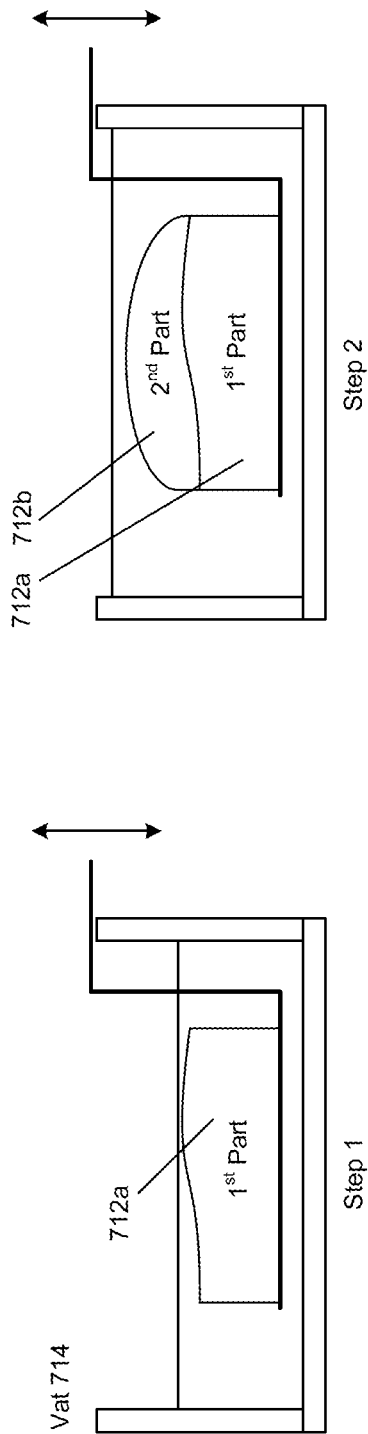
FIG. 7(c) illustrates a second 3D printing process for producing the doublet of FIG. 7(a) in accordance with an example embodiment.

Multi-material printing: Multi-material printing capability is highly demanded for advanced applications, such as manufacturing of a doublet lens which consists of two elements to minimize the chromatic aberrations. FIGS. 7(a) to (c) illustrate example multi-material printing processes for printing a doublet lens. In FIG. 7(a), the final lens (or the desired lens) is shown that includes one element with two materials, depicted as lens 1 and lens 2. In FIG. 7(b), a drop-on-demand method is used with two material dispensers 702, 704 (Dispenser 1 and Dispenser 2) to deposit two different materials; in this configuration an objective lens 706 with a long working distance is needed to direct the laser light 708 to the location of the print material. Next, either UV or thermal curing method is used to immediately cure the material (e.g., droplets) that are deposited via the dispensers. The shape of the component is controlled by the smallest droplets dispensed and the scanning mechanism. As shown in the example diagram of FIG. 7(b), the printed component can have two sections 710a, 710b, which are printed one after another. By controlling the sequence of droplet deposition and illumination, multi-component parts can be printed.

In FIG. 7(c), a second method is illustrated in which the first part 712a of the component is printed from the first material in, for example, the TPP or the PµSL mode. After the printed material is post-cured and cleaned, the structure is placed back into to the material vat 714 filled with a second material to print the second part 712b of the component. In some embodiments, the two methods are combined to print multi-material components. Thus, open the disclosed configuration AM³S with unique capabilities in printing elements in different modes with different curing techniques allows a number of multi-material printing strategies. For example, the disclosed system overcomes the shortcomings of the existing systems by enabling printing of components with more than one type of materials.

It should be noted that different subsections of the disclosed AM³S may be used individually, or in different combinations with other subsections of the system. FIG. 1(a) provides one example combination where a TPP subsection is combined with a UV projection subsection. Referring back to FIG. 2, it is evident that in another example combination, the system can include an IR pulsed laser subsection (e.g., 2 µm laser) and the IR projection subsection (and exclude one or more of the other depicted subsections). One non-limiting example application of disclosed technology relates to printing contact lenses, which are currently produced using other techniques such as diamond turning, or mold-based UV and IR curing.

Figure 8:
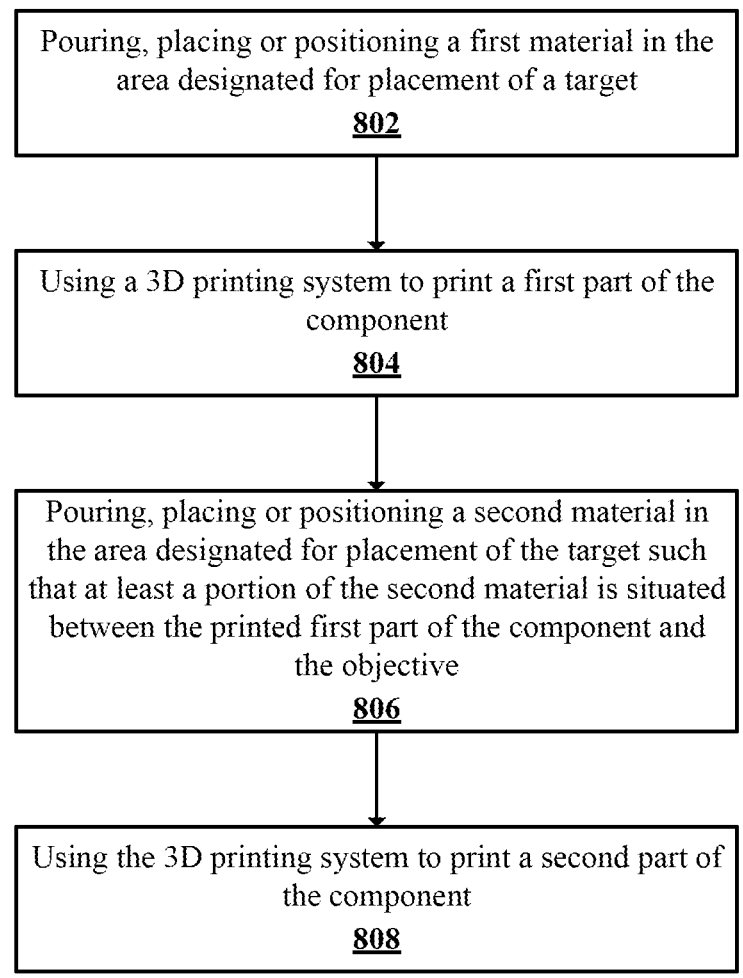
FIG. 8 illustrates a set of operations for three-dimensional (3D) printing a component that includes multiple materials in accordance with an example embodiment.

FIG. 8 illustrates a set of operations for three-dimensional (3D) printing a component that includes multiple materials in accordance with an example embodiment. The operation at 802 includes pouring, placing or positioning a first material in the area designated for placement of a target. The operation at 804 includes using a 3D printing system to print a first part of the component. The operation at 806 includes pouring, placing or positioning a second material in the area designated for placement of the target such that at least a portion of the second material is situated between the printed first part of the component and the objective, and the operation at 808 includes using the 3D printing system to print a second part of the component.

In one example embodiment, the first and the second parts of the component are printed using a drop-on-demand method that includes dispending the first material from a first dispenser prior to 3D printing the first part, using the 3D printing system to print the first part of the component through either UV or thermal curing, dispending the second material from a second dispenser prior to 3D printing the second part, and using the 3D printing system to print the second part of the component through either UV or thermal curing. In another example embodiment, 3D printing the first part of the component includes illuminating the first material that resides in a vat with illumination from the 3D printing system to produce a printed first part, cleaning the first printed part, and placing the cleaned first part in the vat that includes the second material to allow 3D printing of the second part upon illumination of the second material using the 3D printing system.

Figure 9:
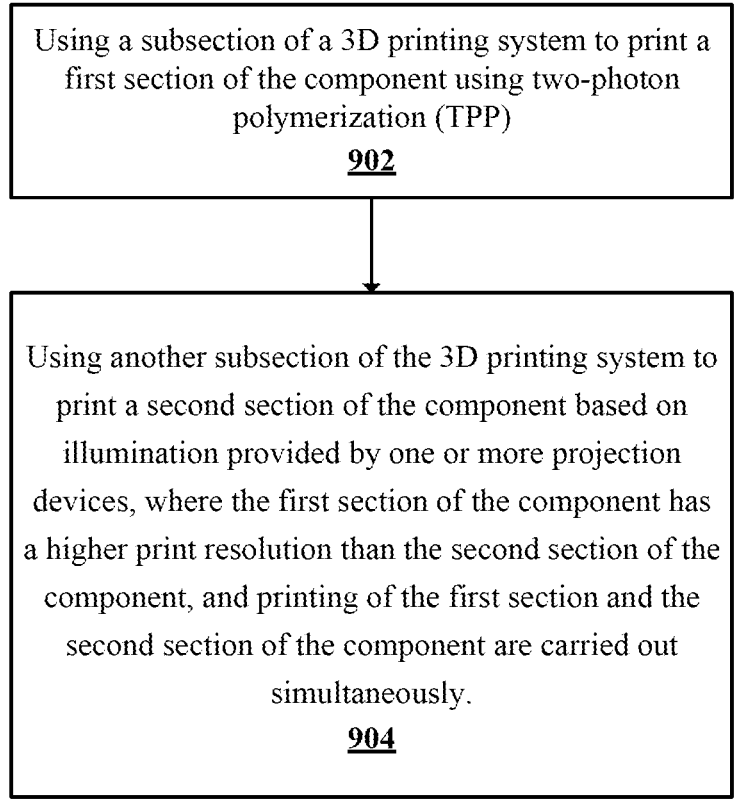
FIG. 9 illustrates a method for three-dimensional (3D) printing a component that includes multiple materials in accordance with another example embodiment.

FIG. 9 illustrates a set of operations of three-dimensional (3D) printing a component in accordance with another example embodiment. The operation at 902 includes using a subsection of a 3D printing system to print a first section of the component using two-photon polymerization (TPP). The operation at 904 includes using another subsection of the 3D printing system to print a second section of the component based on illumination provided by one or more projection devices. In this method, the first section of the component has a higher print resolution than the second section of the component, and printing of the first section and the second section of the component are carried out simultaneously.

In one example embodiment, the component is a transparent component. In another example embodiment, the component is an optical component, or a contact lens. In yet another example embodiment, the component comprises a silicone material.

One aspect of the disclosed embodiments relates to a system for high-resolution three-dimensional (3D) printing that includes a two-photon polymerization (TPP) subsystem including a first light source coupled to an optical fiber positioned to deliver a first laser light to a scanning optical device, and an optical projection subsystem comprising a second light source configured to provide a second light to a digital projection device. The system further includes a dichroic mirror positioned to receive light corresponding to the first light source from the scanning optical device and to receive light corresponding to the second light source from the projection device, and an objective lens positioned to provide illumination to a target material for 3D printing. In this system, the dichroic mirror is configured to allow one of the light corresponding to the first light source or the light corresponding to the second light source to pass therethrough to the objective lens, and to allow the other of the light corresponding to the first light source or the light corresponding to the second light source to be reflected towards the objective lens. Additionally, the objective lens allows simultaneous illumination of the target material with both the light corresponding to the first and the second light sources.

In one example embodiment, the optical projection subsystem is configured to provide illumination to an inner region of the target material, and the TPP subsystem is configured to provide illumination to one or more of: an outer surface, an edge or an internal surface of the target material to produce a printed structure having a surface or an edge with higher resolution than the inner region of the target material. In another example embodiment, the TPP subsystem and the optical projection subsystem are configured to operate simultaneously to illuminate different sections of the target material. In yet another example embodiment, the first light source is a Ti:Sapphire laser and the second light source is one of an ultraviolet (UV) laser, an UV light emitting device (LED) or a UV lamp.

According to one example embodiment, the digital projection device is a digital micromirror device (DMD). In another example embodiment, the dichroic mirror is configured to allow the light corresponding to the first light source to pass therethrough, and to allow the light corresponding to the second light source to be reflected. In still another example embodiment, the objective lens has a working distance of 20 mm or larger.

Another aspect of the disclosed embodiments relates to a system for high-resolution three-dimensional (3D) printing, the system include a photo-thermal curing subsystem comprising a first laser source coupled to an optical fiber positioned to deliver a first laser light to a scanning optical device, an optical projection subsystem comprising a second light source configured to provide a second light to a digital projection device, a dichroic mirror positioned to receive light corresponding to the first laser source from the scanning optical device and to receive light corresponding to the second light source from the projection device, and an objective lens positioned to provide illumination to a target material for 3D printing. In this system, the dichroic mirror is configured to allow one of the light corresponding to the first laser source or the light corresponding to the second light source to pass therethrough to the objective lens, and to allow the other of the light corresponding to the first laser source or the light corresponding to the second light source to be reflected towards the objective lens. In addition, the objective lens in this configuration allows simultaneous illumination of the target material with both the light corresponding to the first laser source and the second light source.

In one example embodiment, the first and the second laser sources are configured to operate at corresponding wavelengths that coincide with one or more high-absorption regions of a silicone material. In another example embodiment, the first or the second laser is configured to operate at or near one of the following wavelengths or range of wavelengths: 1.2 µm, 1.4 µm, 1.7 to 1.85 µm, or 2 µm.

Another aspect of the disclosed embodiments relates to a system for high-resolution three-dimensional (3D) printing that includes a first light source configured to produce a laser output in an infrared (IR) region, a second light source configured to produce a laser output outside of an IR region, where both the first and the second light sources are configured to provide illumination to an optical scanning device to allow 3D printing based on two-photon polymerization (TPP). The system further includes a third light source configured to provide illumination to a first digital projection device, where the third light source is configured to produce an output in an IR region. The system additionally includes a fourth light source configured to provide illumination to a second digital projection device, where the fourth light source configured to produce an output in an ultraviolet (UV) region, and an objective lens positioned to receive light corresponding to the first through the fourth light sources and to provide illumination for 3D printing. In this system, the objective lens allows simultaneous illumination of a target area designated for placement of one or more target material with light corresponding to the first, the second, the third or the fourth light sources.

In one example embodiment, the above system further includes one or more dichroic mirrors positioned to allow propagation of light corresponding to the first, the second, the third or the fourth light sources to the area designated for placement of one or more target material. In another example embodiment, the system further includes multiple material dispensers to allow different materials to be poured, placed or positioned in the target area to allow 3D printing using one or more of the first, the second, the third or the fourth light sources. In yet another example embodiment, the system further includes a chamber configured to surround the target material and to provide a vacuum chamber that can be filled with one or more gasses. In one example embodiment, the one or more gasses includes nitrogen. In still another example embodiment, the system further includes one or both of a polarization-sensitive optical coherence tomography (PS-OCT) device or a snapshot interferometric system. In one example embodiment, the first and the second light sources are pulsed lasers, and the third and the fourth light sources are continuous wave (CW) lasers. In another example embodiment, the third and the fourth light sources are light emitting diodes (LEDs).

It should be noted that for the disclosed he methods and/or devices, one or more of the following is true: a resolution of the 3D printed structure is in the range 100 nm to 100 µm; a dimension of the 3D printer matter is in the range of micrometer to 25 cm; and/or the 3D printed structure has one of a deformable, a semi-rigid or a rigid structure.

At least part of the disclosed devices or modules may be implemented as hardware, software, or combinations thereof to enable control of various devices, to receive or transmit various information and signals, and to conduct signal and data processing operations. For example, a hardware implementation of electronic devices can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that are known in the art, including, but not limited to, communications over the Internet, wired, or wireless networks using the appropriate protocols.

Various information and data processing operations described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

What is claimed is:

1. A system for high-resolution three-dimensional (3D) printing, the system comprising:
   a two-photon polymerization (TPP) subsystem comprising a first light source coupled to an optical fiber positioned to deliver a first laser light to a scanning optical device;
   an optical projection subsystem comprising a second light source configured to provide a second light to a digital projection device;
   a dichroic mirror positioned to receive light corresponding to the first light source from the scanning optical device and to receive light corresponding to the second light source from the projection device; and
   an objective lens positioned to provide illumination to a target material for 3D printing, wherein:
   the dichroic mirror is configured to allow one of the light corresponding to the first light source or the light corresponding to the second light source to pass therethrough to the objective lens, and to allow the other of the light corresponding to the first light source or the light corresponding to the second light source to be reflected towards the objective lens, and
   wherein the objective lens allows simultaneous illumination of the target material with both the light corresponding to the first and the second light sources, and the illumination provided by the light corresponding to each of the first and the second light sources contributes to the 3D printing of at least a portion of a 3D printed structure.

2. The system of claim 1, wherein
   the optical projection subsystem is configured to provide illumination to an inner region of the target material, and
   the TPP subsystem is configured to provide illumination to one or more of: an outer surface, an edge or an internal surface of the target material to produce the printed structure having a surface or an edge with higher resolution than the inner region of the target material.

3. The system of claim 2, wherein the TPP subsystem and the optical projection subsystem are configured to operate simultaneously to illuminate different sections of the target material.

4. The system of claim 1, wherein the first light source is a Ti:Sapphire laser and the second light source is one of an ultraviolet (UV) laser, an UV light emitting device (LED) or a UV lamp.

5. The system of claim 1, wherein the digital projection device is a digital micromirror device (DMD).

6. The system of claim 1, wherein the dichroic mirror is configured to allow the light corresponding to the first light source to pass therethrough, and to allow the light corresponding to the second light source to be reflected.

7. The system of claim 1, wherein the objective lens has a working distance of 20 mm or larger.

8. A system for high-resolution three-dimensional (3D) printing, the system comprising:
   a photo-thermal curing subsystem comprising a first laser source coupled to an optical fiber positioned to deliver a first laser light to a scanning optical device;
   an optical projection subsystem comprising a second light source configured to provide a second light to a digital projection device;
   a dichroic mirror positioned to receive light corresponding to the first laser source from the scanning optical device and to receive light corresponding to the second light source from the projection device; and
   an objective lens positioned to provide illumination to a target material for 3D printing, wherein:
   the dichroic mirror is configured to allow one of the light corresponding to the first laser source or the light corresponding to the second light source to pass therethrough to the objective lens, and to allow the other of the light corresponding to the first laser source or the light corresponding to the second light source to be reflected towards the objective lens, and
   wherein the objective lens allows simultaneous illumination of the target material with both the light corresponding to the first laser source and the second light source, and the illumination provided by the light corresponding to each of the first laser source and the second light source contributes to the 3D printing of at least a portion of a 3D printed structure.

9. The system of claim 8, wherein the first laser source and the second light source are configured to operate at corresponding wavelengths that coincide with one or more high-absorption regions of a silicone material.

10. The system of claim 8, wherein the first laser source or the second light source is configured to operate at or near one of the following wavelengths or range of wavelengths: 1.2 μm, 1.4 μm, 1.7 to 1.85 μm, or 2 μm.

* * * * *